US010455416B2

(12) United States Patent
Nalukurthy et al.

(10) Patent No.: US 10,455,416 B2
(45) Date of Patent: Oct. 22, 2019

(54) SYSTEMS AND METHODS FOR PROVIDING A SECURED PASSWORD AND AUTHENTICATION MECHANISM FOR PROGRAMMING AND UPDATING SOFTWARE OR FIRMWARE

(71) Applicant: Honeywell International Inc., Morristown, NJ (US)

(72) Inventors: RajeshBabu Nalukurthy, Bangalore (IN); SivaSankar Mathuraju, Bangalore (IN); Kanaka Nagendra Prasad Naraharisetti, Bangalore (IN); Balamurugan Venkatesh, Hosur (IN); Murali R, Bangalore (IN)

(73) Assignee: Honeywell International Inc., Morris Plains, NJ (US)

( * ) Notice: Subject to any disclaimer, the term of this patent is extended or adjusted under 35 U.S.C. 154(b) by 196 days.

(21) Appl. No.: 15/606,408

(22) Filed: May 26, 2017

(65) Prior Publication Data
US 2018/0343562 A1 Nov. 29, 2018

(51) Int. Cl.
*H04L 29/06* (2006.01)
*H04W 12/04* (2009.01)
(Continued)

(52) U.S. Cl.
CPC .............. *H04W 12/04* (2013.01); *G06F 8/65* (2013.01); *H04L 9/3215* (2013.01);
(Continued)

(58) Field of Classification Search
CPC ........ H04W 12/00; G06F 21/30; G06F 21/50; G06F 21/51; G06F 21/57
See application file for complete search history.

(56) References Cited

U.S. PATENT DOCUMENTS 6,993,658 B1 * 1/2006 Engberg ................. G06F 21/43
379/114.2
7,624,452 B2 * 11/2009 Young ..................... H04L 67/02
726/30

(Continued)

OTHER PUBLICATIONS

Extended European Search Report for corresponding EP patent application 18171357.9, dated Sep. 12, 2018.

*Primary Examiner* — Ponnoreay Pich
(74) *Attorney, Agent, or Firm* — Brooks, Cameron & Huebsch, PLLC

(57) ABSTRACT

Systems and methods for providing a secured password and authentication mechanism for programming and updating software and firmware are provided. Some methods can include a control panel device or a server device generating a onetime password or security token, the control panel device or the server device identifying an authorized user and a phone number of a mobile device associated with the authorized user, the control panel device or the server device using the phone number to transmit the onetime password or security token to the mobile device, the control panel device receiving user input including the onetime password or security token and instructions to program or update the software or firmware of the control panel device or to power off or restart the control panel device, and the control panel device executing the instructions when the onetime password or security token is valid.

20 Claims, 3 Drawing Sheets

(51) Int. Cl.
*G06F 8/65* (2018.01)
*H04L 9/32* (2006.01)
*H04W 12/06* (2009.01)
*H04L 29/08* (2006.01)
*H04W 4/02* (2018.01)

(52) U.S. Cl.
CPC .......... *H04L 9/3228* (2013.01); *H04L 63/062* (2013.01); *H04L 63/0838* (2013.01); *H04L 63/0846* (2013.01); *H04W 12/06* (2013.01); *H04L 67/306* (2013.01); *H04W 4/02* (2013.01)

(56) References Cited

U.S. PATENT DOCUMENTS

| | | | |
|---|---|---|---|
| 8,606,995 B2 | 12/2013 | Sharma et al. | |
| 8,971,538 B1 * | 3/2015 | Marr | H04L 63/145 380/285 |
| 8,990,888 B2 | 3/2015 | Busser et al. | |
| 9,276,752 B2 * | 3/2016 | Abraham | G06F 21/57 |
| 2003/0172272 A1 * | 9/2003 | Ehlers | H04L 63/0853 713/170 |
| 2007/0174904 A1 * | 7/2007 | Park | H04L 63/0838 726/7 |
| 2007/0220271 A1 | 9/2007 | Law | |
| 2009/0200371 A1 * | 8/2009 | Kean | G06F 21/31 235/379 |
| 2014/0052976 A1 * | 2/2014 | Marino | G06F 21/56 713/2 |
| 2015/0095478 A1 * | 4/2015 | Zuerner | H04L 67/12 709/223 |
| 2015/0221152 A1 | 8/2015 | Andersen | |
| 2015/0302674 A1 * | 10/2015 | Kuruba | G07C 9/00166 340/5.54 |
| 2016/0044032 A1 * | 2/2016 | Kim | H04L 63/0876 726/5 |
| 2017/0099353 A1 * | 4/2017 | Arora | H04L 67/12 |
| 2018/0157557 A1 * | 6/2018 | Puustinen | G06F 11/1438 |
| 2018/0165088 A1 * | 6/2018 | Bonar | G06F 8/65 |
| 2018/0208448 A1 * | 7/2018 | Zimmerman | B67D 1/0888 |

* cited by examiner

SYSTEMS AND METHODS FOR PROVIDING A SECURED PASSWORD AND AUTHENTICATION MECHANISM FOR PROGRAMMING AND UPDATING SOFTWARE OR FIRMWARE

FIELD

The present invention relates to programming and updating firmware. More particularly, the present invention relates to systems and methods for providing a secured password and authentication mechanism for programming and updating software or firmware.

BACKGROUND

It is known to use a USB flash drive and/or configuration software to program and/or update the software or firmware of a control panel device. However, cyber security is a challenge, especially with respect to threats from insiders of or disgruntled employees who work in a region monitored by the control panel device.

For example, any user can use a USB flash drive or a configuration tool to connect to a control panel device. Known control panel devices require a password to program and/or update the software or firmware of the control panel device, but accept the same password for all users. That is, several users can use the same password to program and/or update the software or firmware of the control panel device. However, such a password is not secure because it can be shared with or stolen by an unauthorized person who can alter the control panel device in a manner that can cause serious safety issues. Furthermore, when an authorized user, such as an employee, leaves an organization that operates in the region monitored by the control panel device, such an authorized user knows the password and, when disgruntled, might use the password to access the control panel device in a manner that can cause serious safety issues, for example, by disabling the control panel device or zones in the region.

In view of the above, there is a continuing, ongoing need for improved systems and methods.

DETAILED DESCRIPTION

Figure 1:
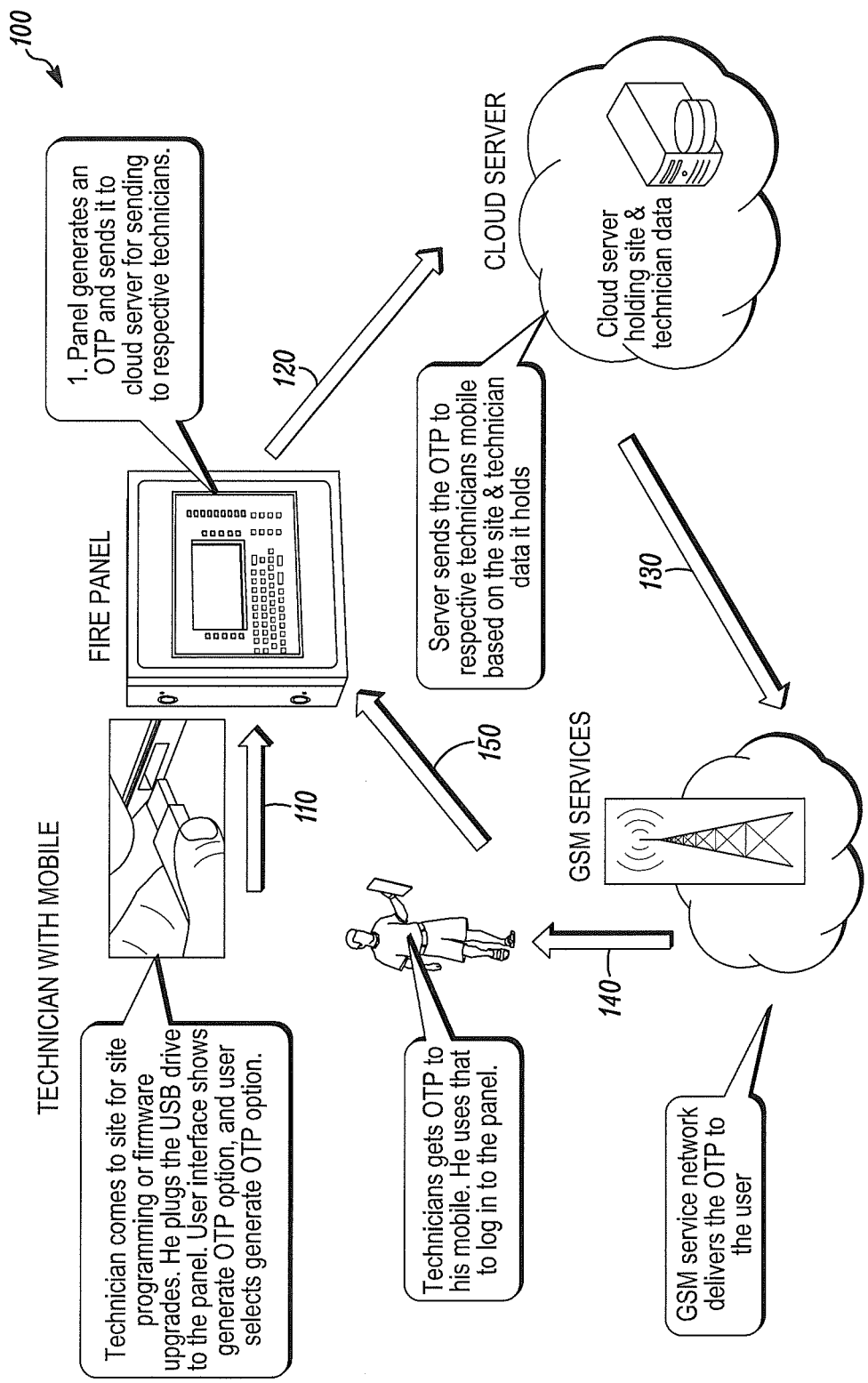
FIG. 1 is a flow diagram of a method in accordance with disclosed embodiments.

While this invention is susceptible of an embodiment in many different forms, there are shown in the drawings and will be described herein in detail specific embodiments thereof with the understanding that the present disclosure is to be considered as an exemplification of the principles of the invention. It is not intended to limit the invention to the specific illustrated embodiments.

Embodiments disclosed herein can include systems and methods for providing a secured password and authentication mechanism for programming and updating software and firmware. For example, some systems and methods disclosed herein can include generating a onetime password (OTP) or security token that can be sent to an authorized user for use in programming and updating software or firmware of a control panel device, for example, a control panel device that is part of a fire or security alarm system or that is part of any connected home system with internet of things (IoT) devices. In some embodiments, the control panel device or a server device in communication with the control panel device can generate the onetime password or security token, in some embodiments, the onetime password or security token can include a time based token that can be valid for and expire a predetermined period of time after the onetime password or security token is generated, and in some embodiments, the authorized user can login to the control panel device using the onetime password or security token to access the software and firmware of the control panel device.

In some embodiments, a server device in communication with a control panel device in a region can include a database of authorized users and phone numbers of mobile devices associated with the authorized users. In these embodiments, the control panel device can generate a onetime password or security token, and when the control panel device generates the onetime password or security token, the control panel device can use GSM capability to transmit the onetime password or security token to the server device, and the server device can identify from the database one of the authorized users associated with the region in which the control panel device is located, identify from the database the phone number of a mobile device associated with the one of the authorized users, and transmit the onetime password or security token to the mobile device associated with the one of the authorized users for use in programming and updating software or firmware of the control panel device. In these embodiments, the authorized users and the phone numbers of the mobile devices associated with the authorized users can be updated in the database in the server device as needed, for example, by the owner of the region in which the control panel device is located.

In some embodiments, a control panel device in a region can include a memory device for storing a phone number of a mobile device associated with an authorized user, and the phone number can be input into the memory device during the commissioning of the control panel device. In these embodiments, the control panel device can generate a onetime password or security token, and when the control panel device generates the onetime password or security token, the control panel device can identify from the memory device the phone number of the mobile device associated with the authorized user and transmit the onetime password or security token to the mobile device associated with the authorized user for use in programming and updating software or firmware of the control panel device. For example, the control panel device can use GSM capability to communicate with the mobile device associated with the authorized user or can include one or more communicator cards that could be a sub-system or part of the control panel device and have 3G or 4G capability for communicating with the mobile device associated with the authorized user or, in some embodiments, for communicating with a server device.

In accordance with disclosed embodiments, the control panel device can generate the onetime password or security token using an algorithm that uses as an input parameter a unique identification number associated with the control panel device, such as the serial number of the control panel device. Accordingly, the onetime password or security token can be unique to the control panel device and will not work for other control panel devices.

In some embodiments, a server device in communication with a control panel device in a region can generate a onetime password or security token. In these embodiments, the server device can include a database of phone numbers of mobile devices associated with authorized users. The control panel device can use GSM capability to transmit instructions to the server device to generate the onetime password or security token for an authorized user associated with the region in which the control panel device is located, and responsive thereto, the server device can generate the onetime password or security token, identify from the database the phone number of a mobile device associated with the authorized user, and transmit the onetime password or security token to the mobile device associated with the authorized user for use in programming and updating software or firmware of the control panel device. Then, the authorized user can input the onetime password or security token to the control panel device, and upon receipt of the onetime password or security token, the control panel device can use GSM capability to transmit the onetime password or security token to the server device, which can authenticate or validate the onetime password or security token.

In accordance with disclosed embodiments, the server device can generate the onetime password or security token using an algorithm that uses as an input parameter a unique identification number associated with the control panel device, such as the serial number of the control panel device. In these embodiments, the control panel device can transmit the required input parameters, such as the serial number of the control panel device, with the instructions to generate the onetime password or security token to the server device. Accordingly, the onetime password or security token can be unique to the control panel device and will not work for other control panel devices.

In accordance with disclosed embodiments, a control panel device as disclosed herein or a server device as disclosed herein can include GSM capability, be connected to a sub-module with GSM capability, or be connected to a cloud or internet based device within the infrastructure of the system monitored by the control panel device. Accordingly, the control panel device or the server device can use GSM capability or internet connectivity for communicating with other devices.

In some embodiments, a user interface device of the control panel device can display a menu to navigate to a password management screen and can receive user input with instructions for generating a onetime password or security token. Additionally or alternatively, in some embodiments, a user interface of another device connected to the control panel device can receive user input with instructions for generating the onetime password or security token.

In some embodiments, systems and methods disclosed herein can generated dual onetime passwords or security tokens, wherein a first of the dual onetime passwords or security tokens can be sent to a first authorized user and a second of the dual onetime passwords or security tokens can be sent to a second authorized user. In these embodiments, both the first and second dual onetime passwords or security tokens are required to login to a control panel device to program and update software or firmware of the control panel device.

In some embodiments, when a control panel device as disclosed herein is powered off or restarted, the onetime password or security token as disclosed herein can be required to navigate menus of the control panel device, thereby creating a record of and notification to a facility manager or supervisor about who powered off the control panel device (authorized or unauthorized person) or about the restart and the power recycling of the control panel device.

It is to be understood that each of the control panel device and the server device as disclosed and described herein can include a transceiver device, a memory device, and a user interface device, each of which can be in communication with respective control circuitry, one or more programmable processors, and executable control software as would be understood by one of ordinary skill in the art. The executable control software can be stored on a transitory or non-transitory computer readable medium, including but not limited to, local computer memory, RAM, optical storage media, magnetic storage media, flash memory, and the like. In some embodiments, some or all of the control circuitry, the programmable processors, and the control software can execute and control at least some of the methods described herein.

Advantages of the systems and methods disclosed herein can include, but are not limited to enhanced security, reduction in time, effort, and cost, elimination of security threats, prevention of hackers stealing a password that can be used in an unauthorized manner, and automation of the authentication process. For example, in accordance with disclosed embodiments, a user need not remember a password or contact technical support when a password is lost or forgotten.

FIG. 1 is a flow diagram of a method 100 in accordance with disclosed embodiments. As seen in FIG. 1, the method 100 can include a user plugging a USB flash drive into a control panel device, a user interface of the control panel device displaying a menu including a onetime password option, and the user interface receiving user input selecting the onetime password option as in 110. Responsive to the user input, the method 100 can include the control panel device generating a onetime password and transmitting the onetime password to a cloud server device as in 120. Then, the method 100 can include the cloud server device identifying from a database an authorized user associated with the control panel device or a region in which the control panel device is located, identifying from the database a phone number of a mobile device associated with the authorized user, and transmitting the onetime password to the mobile device of the authorized user as in 130 via a GSM based network as in 140. Finally, the method 100 can include the mobile device of the authorized user receiving the onetime password as in 150, which the authorized user can use to login to the control panel device to program and update software or firmware of the control panel device. For example, in some embodiments, the USB flash drive can include instructions to program or update the software or the firmware of the control panel device that can be executed upon the authorized user entering the onetime password into the control panel device.

Figure 2:
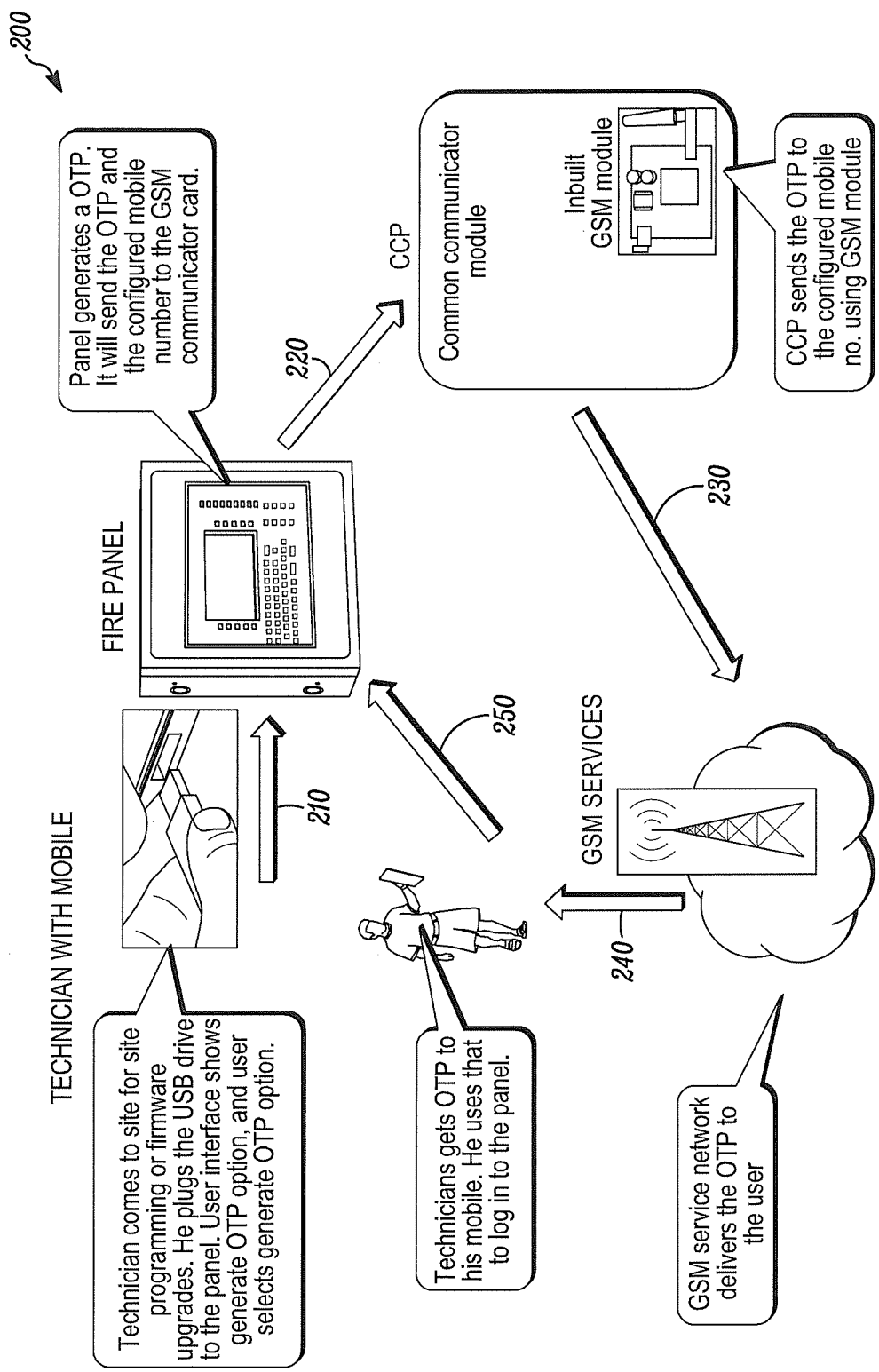
FIG. 2 is a flow diagram of a method in accordance with disclosed embodiments.

FIG. 2 is a flow diagram of a method 200 in accordance with disclosed embodiments. As seen in FIG. 2, the method 200 can include a user plugging a USB flash drive into a control panel device, a user interface of the control panel device displaying a menu including a onetime password option, and the user interface receiving user input selecting the onetime password option as in 210. Responsive to the user input, the method 200 can include the control panel device generating a onetime password, identifying from a database an authorized user associated with the control panel device or a region in which the control panel device is located, identifying from the database a phone number of a mobile device associated with the authorized user, and transmitting the onetime password to a communicator card or module that is a sub-system or a part of the control panel device as in 220. Then, the method 200 can include the communicator card or module transmitting the onetime password to the mobile device of the authorized user as in 230 via a GSM based network as in 240. Finally, the method 200 can include the mobile device of the authorized user receiving the onetime password as in 250, which the authorized user can use to login to the control panel device to program and update software or firmware of the control panel device. For example, in some embodiments, the USB flash drive can include instructions to program or update the software or the firmware of the control panel device that can be executed upon the authorized user entering the onetime password into the control panel device.

Figure 3:
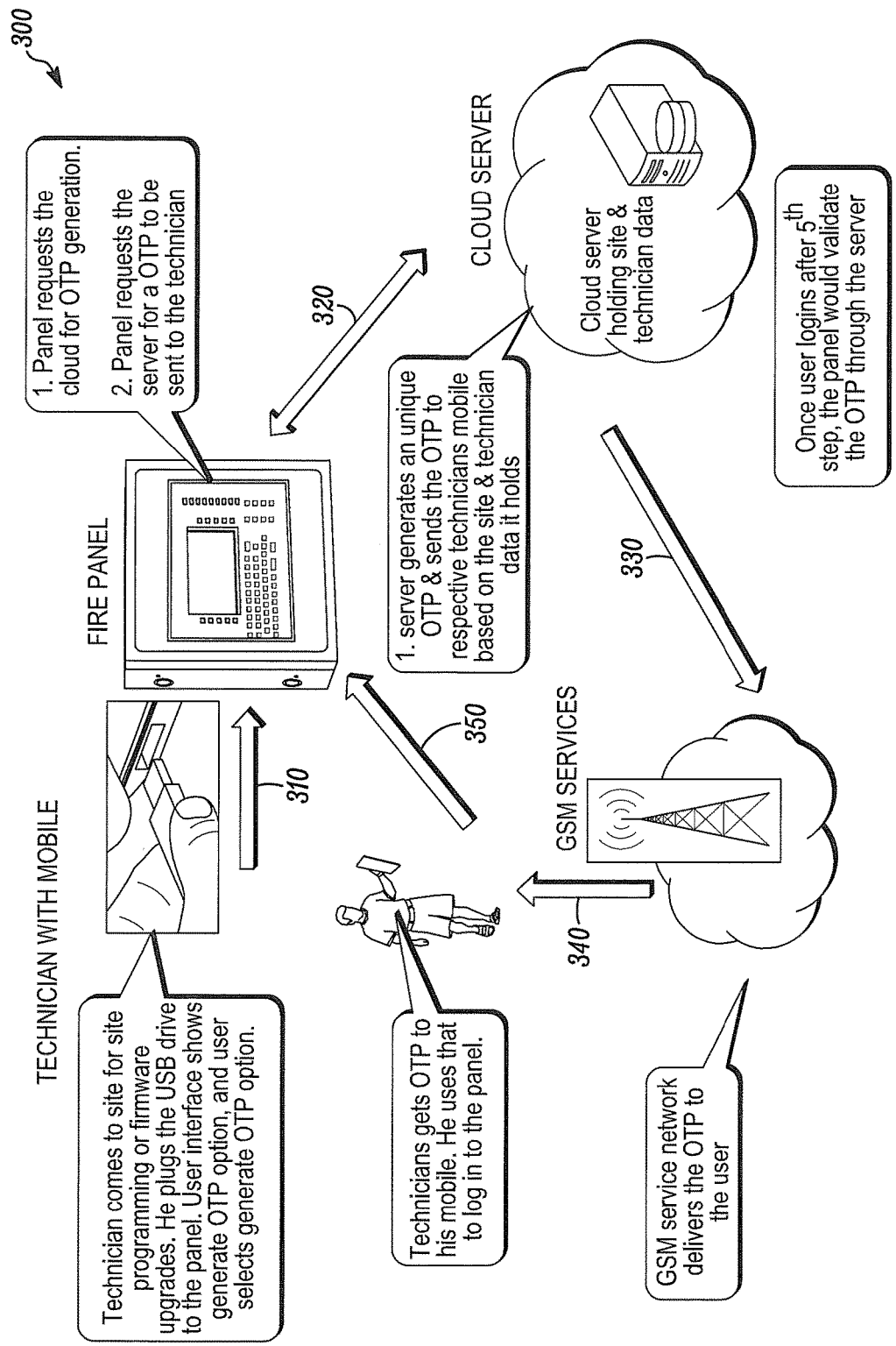
FIG. 3 is a flow diagram of a method in accordance with disclosed embodiments.

FIG. 3 is a flow diagram of a method 300 in accordance with disclosed embodiments. As seen in FIG. 3, the method 300 can include a user plugging a USB flash drive into a control panel device, a user interface of the control panel device displaying a menu including a onetime password option, and the user interface receiving user input selecting the onetime password option as in 310. Responsive to the user input, the method 300 can include the control panel device transmitting a request to a cloud server device for the cloud server device to generate a onetime password and to transmit the onetime password to an authorized user associated with the control panel device or a region in which the control panel device is located as in 320. Responsive to the request from the control panel device, the method 300 can include the cloud server device generating the onetime password, identifying from a database a phone number of a mobile device associated with the authorized user, and transmitting the onetime password to the mobile device of the authorized user as in 330 via a GSM based network as in 340. Then, the method 300 can include the mobile device of the authorized user receiving the onetime password as in 350, which the authorized user can use to login to the control panel device and, upon authentication and validation by the cloud server device, program and update software or firmware of the control panel device. For example, in some embodiments, the USB flash drive can include instructions to program or update the software or the firmware of the control panel device that can be executed upon the authorized user entering the onetime password into the control panel device, and the cloud server device authenticating and validating the entered onetime password.

Although a few embodiments have been described in detail above, other modifications are possible. For example, the logic flows described above do not require the particular order described or sequential order to achieve desirable results. Other steps may be provided, steps may be eliminated from the described flows, and other components may be added to or removed from the described systems. Other embodiments may be within the scope of the invention.

From the foregoing, it will be observed that numerous variations and modifications may be effected without departing from the spirit and scope of the invention. It is to be understood that no limitation with respect to the specific system or method described herein is intended or should be inferred. It is, of course, intended to cover all such modifications as fall within the spirit and scope of the invention.

What is claimed is:

1. A system, comprising:
 a control panel device installed in a region configured to:
  receive a first user input requesting a onetime password;
  generate the onetime password and transmit the onetime password to a server device in response to receiving the first user input;
  receive a second user input including the onetime password and instructions to program or update software or firmware of the control panel device or to power off or restart the control panel device; and
  execute the instructions to program or update the software or the firmware of the control panel device or to power off or restart the control panel device when the onetime password is valid in response to receiving the second user input; and
 the server device configured to:
  identify an authorized user associated with the control panel device or the region; and
  identify a phone number of a mobile device associated with the authorized user, wherein the server device uses the phone number to transmit the onetime password to the mobile device.

2. The system of claim 1, wherein the control panel device is part of a fire or security alarm system.

3. The system of claim 1, wherein the control panel device is part of a connected home system and connected to a plurality of IoT devices.

4. The system of claim 1, wherein the onetime password is valid for a predetermined period of time after the onetime password is generated.

5. The system of claim 1, wherein the onetime password expires after a predetermined period of time after the onetime password is generated.

6. The system of claim 1, wherein the server device identifies the authorized user and the phone number of the mobile device from a database device.

7. A system comprising a control panel device installed in a region configured to:
 receive a first user input requesting a onetime password;
 generate the onetime password, identifying an authorized user associated with the control panel device or the region, and identifying a phone number of a mobile device associated with the authorized user in response to receiving the first user input;
 transmit the onetime password and the phone number to a communicator card or a communicator module, wherein the communicator card or the communicator module transmits the onetime password to the mobile device using the phone number;
 receive a second user input including the onetime password and instructions to program or update software or firmware of the control panel device or to power off or restart the control panel device; and
 execute the instructions to program or update the software or the firmware of the control panel device or to power off or restart the control panel device when the onetime password is valid in response to receiving the second user input.

8. The system of claim 7, wherein the control panel device is part of a fire or security alarm system.

9. The system of claim 7, wherein the control panel device is part of a connected home system and connected to a plurality of IoT devices.

10. The system of claim 7, wherein the onetime password is valid for a predetermined period of time after the onetime password is generated.

11. The system of claim 7, wherein the onetime password expires after a predetermined period of time after the onetime password is generated.

12. The system of claim 7, wherein the control panel device identifies the authorized user and the phone number of the mobile device from a database device.

13. The system of claim 7, wherein the communicator card or the communicator module is part of the control panel device.

14. A system, comprising:
a control panel device installed in a region configured to:
receive a first user input requesting a onetime password;
responsive to the first user input, transmit a request message to a server device requesting the server device to generate the onetime password and to transmit the onetime password to an authorized user associated with the control panel device or the region;
receive a second user input including the onetime password and instructions to program or update the software or the firmware of the control panel device or to power off or restart the control panel device; and
responsive to the second user input, execute the instructions to program or update the software or the firmware of the control panel device or to power off or restart the control panel device when the onetime password is valid; and the server device configured to:
responsive to the request message, generate the onetime password and identify a phone number of a mobile device associated with the authorized user; and
transmit the onetime password to the mobile device using the phone number.

15. The system of claim 14, wherein the control panel device is part of a fire or security alarm system.

16. The system of claim 14, wherein the control panel device is part of a connected home system and connected to a plurality of IoT devices.

17. The system of claim 14, wherein the onetime password is valid for a predetermined period of time after the onetime password is generated.

18. The system of claim 14, wherein the onetime password expires after a predetermined period of time after the onetime password is generated.

19. The system of claim 14, wherein the server device identifies the phone number of the mobile device associated with the authorized user from a database device.

20. The system of claim 14, further configured so that:
responsive to the second user input, the control panel device transmits the onetime password to the server device; and
responsive to receiving the onetime password from the control panel device, the server device validates the onetime password.

* * * * *